United States Patent
Rozario et al.

(10) Patent No.: US 9,740,557 B2
(45) Date of Patent: Aug. 22, 2017

(54) PIPELINED ECC-PROTECTED MEMORY ACCESS

(71) Applicant: Imagination Technologies Limited, Kings Langley (GB)

(72) Inventors: Ranjit J Rozario, San Jose, CA (US); Ranganathan Sudhakar, Santa Clara, CA (US)

(73) Assignee: Imagination Technologies Limited, Kings Langley (GB)

( * ) Notice: Subject to any disclaimer, the term of this patent is extended or adjusted under 35 U.S.C. 154(b) by 50 days.

(21) Appl. No.: 14/612,084

(22) Filed: Feb. 2, 2015

(65) Prior Publication Data
US 2015/0242274 A1   Aug. 27, 2015

Related U.S. Application Data

(60) Provisional application No. 61/944,323, filed on Feb. 25, 2014.

(51) Int. Cl.
*G06F 11/10* (2006.01)

(52) U.S. Cl.
CPC .................. *G06F 11/1064* (2013.01)

(58) Field of Classification Search
CPC ............. G06F 11/1064; G06F 11/1048; G06F 11/1016; G06F 11/0763; G06F 12/0802; G06F 12/0877
See application file for complete search history.

(56) References Cited

U.S. PATENT DOCUMENTS

| | | | |
|---|---|---|---|
| 5,509,119 A * | 4/1996 | La Fetra | G06F 11/1064 714/52 |
| 5,860,104 A * | 1/1999 | Witt | G06F 9/3004 711/126 |
| 7,120,836 B1 | 10/2006 | Englin et al. | |
| 2004/0001269 A1* | 1/2004 | Itou | G06F 11/1064 360/53 |
| 2008/0163008 A1* | 7/2008 | Jacob | G06F 12/0895 714/699 |
| 2012/0254698 A1* | 10/2012 | Ozer | G06F 11/106 714/764 |

OTHER PUBLICATIONS

Butler Lampson, "Lazy and Speculative Execution", Microsoft Research OPODIS, Bordeaux, France Dec. 12, 2006, p. 21.*

* cited by examiner

*Primary Examiner* — Cynthia Britt
*Assistant Examiner* — Rong Tang
(74) *Attorney, Agent, or Firm* — Vorys, Sater, Seymour & Pease LLP; Vincent M DeLuca

(57) ABSTRACT

In one aspect, a pipelined ECC-protected cache access method and apparatus provides that during a normal operating mode, for a given cache transaction, a tag comparison action and a data RAM read are performed speculatively in a time during which an ECC calculation occurs. If a correctable error occurs, the tag comparison action and data RAM are repeated and an error mode is entered. Subsequent transactions are processed by performing the ECC calculation, without concurrent speculative actions, and a tag comparison and read are performed using only the tag data available after the ECC calculation. A reset to normal mode is effected by detecting a gap between transactions that is sufficient to avoid a conflict for use of tag comparison circuitry for an earlier transaction having a repeated tag comparison and a later transaction having a speculative tag comparison.

13 Claims, 6 Drawing Sheets

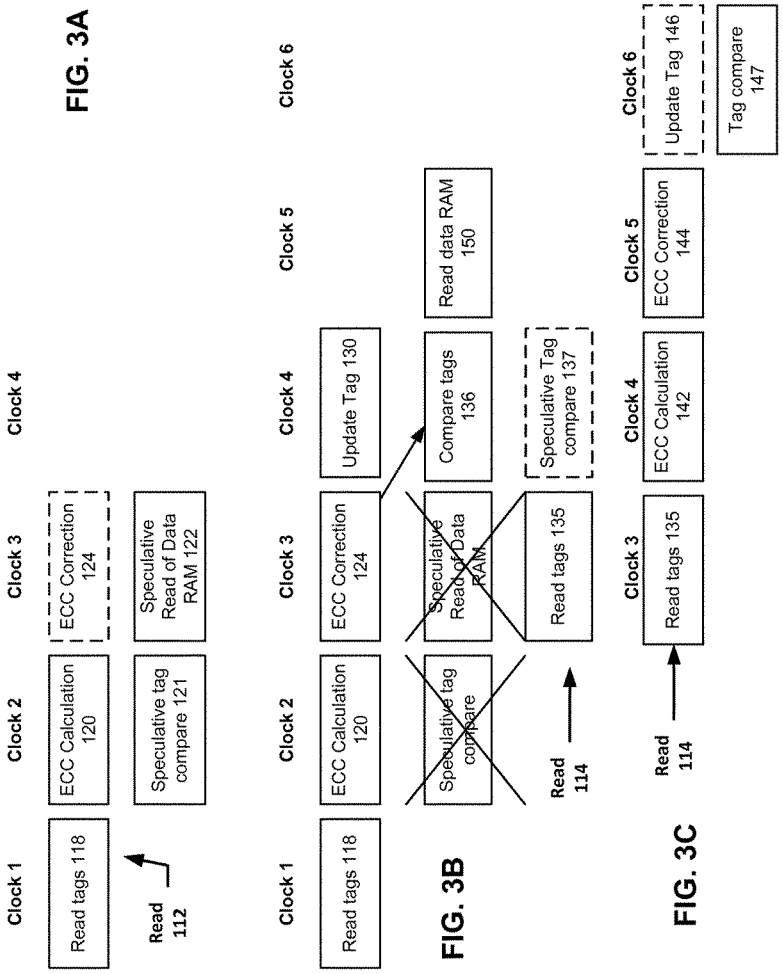

PIPELINED ECC-PROTECTED MEMORY ACCESS

CROSS REFERENCE TO RELATED APPLICATIONS

This application claims priority from U.S. Provisional App. No. 61/944,323, filed on Feb. 25, 2014, which is incorporated by reference herein for all purposes.

BACKGROUND

Field

In one aspect, the following relates to pipelined processing of requests, and in one particular aspect, to a pipeline for accessing ECC protected memory, such as a cache.

Related Art

Although semiconductor memories are generally reliable, potential errors in caches, such as soft errors, have become an increasing concern as geometries of transistors implementing bit cells of caches continue to shrink. As transistor geometries continue to shrink, an amount of energy required to change a value of a particular bit continues to decrease as well. Therefore, error detection and error correction have become increasingly important capabilities of memories, such as caches and as well as Dynamic Random Access Memory (DRAM). Providing error detection or error detection and correction comes at some cost, which in general is related to a capability of the technique employed to detect and correct different kinds of errors. Typically, some form of processing is applied to a set of bits over which error detection and/or error detection and correction is desired. Such processing typically results in one or more additional bits that are associated with the set of bits. Techniques that support a capability to detect and correct at least one-bit errors are often called Error Correcting Codes (ECC), while a code that simply detects but cannot correct an error is typically called an Error Detection Code. For example, a parity bit can be used to detect but not correct a one bit error in a set of bits. For example, a common Hamming code can be applied to a set of bits and a result of that application are bits that can be used to detect and correct one bit errors and detect, but not correct, two-bit errors. Using ECC on cache data increases an amount of processing required in order to read the caches.

SUMMARY

In one aspect, a cache has tags that are protected by Error Correction Code (ECC) techniques. Transactions to the cache are processed in a pipelined fashion, such that multiple transactions are overlapped in time, using different functional units. Also, some portions of the pipeline can be speculatively executed, for a given transaction, such that some operations for the same transaction also can overlap in time. An example pipeline is to read tags and ECC bits on one clock, and begin a two-cycle ECC process. The pipeline can, in a normal operating mode, then begin a speculative tag compare and data RAM read in those cycles. If the ECC process indicates no error, then the transaction can complete. If there is a correctable error, then an update to the tag RAM occurs, and a tag compare is performed for the corrected tags, and then a data RAM is read for a matching way of the cache. The pipeline is set to operate in an error mode, in which a subsequent transaction does not have a speculative tag compare performed, and rather, the ECC calculation is allowed to proceed and data resulting therefrom is used for the comparison, regardless whether there was or wasn't any error detected for that transaction. The pipeline can return to a normal mode when there is a gap in transactions of at least a predetermined size (e.g., of two or more clocks). However, a number of transactions may be processed while in error mode, even though they do not have an error, awaiting the gap.

Aspects of the disclosure can be practiced within a Level 2 (L2) and/or a Level 3 (L3) cache of a computing system, for example. Other aspects include a non-transitory machine readable medium that includes data to produce an apparatus that functions as disclosed. Still further aspects relate to apparatuses and methods of pipelined processing, where certain functional elements may need to be reused, depending on event(s) occurring during processing. The pipeline is provided with two or more operating modes; the operating modes provide pipelines of different lengths, and a longer pipeline length is transitorily entered in order to process a set of close-in-time transactions in which the event(s) occurred, until the pipeline can be reset to a shorter-length operating mode.

An aspect of the disclosure pertains to a pipelined Error Correction Code (ECC) cache access method, which involves identifying a set of tags corresponding to respective set bits of a first transaction. The set of tags is associated with ECC bits. If operating in a normal mode, then the method provides for speculatively beginning to compare the set of tags with an address portion supplied with the first transaction, using tag comparison circuitry, and also beginning an ECC calculation and correction process on the set of tags using the ECC bits. In response to detecting a correctable error in the set of tags, the method provides for reprocessing a corrected set of tags using the tag comparison circuitry, and entering an error mode. The method also involves processing subsequent transactions that occur while the error mode is in effect by using the tag comparison circuitry only to compare a respective set of tags for that transaction available after completing a respective ECC calculation and correction process for that set of tags and resetting to a normal operating mode in response to detecting a gap between transactions sufficient to avoid a conflict for access to the tag comparison circuitry by multiple of the transactions.

An aspect of the disclosure involves a method of pipelining processing of transactions in a data processing apparatus, which comprises, during a normal mode, performing two or more tasks overlapped in time to process a transaction. The method also involves determining a result of at least one of the tasks, and in response to the result indicating an error condition, performing another of the tasks again using an output from the at least one of the tasks, and entering an error mode. While in the error mode, the method involves performing the two or more tasks sequentially, for a subsequent transaction and resetting to the normal mode in response to detecting that another transaction will commence processing at a time that does not cause contention between that transaction and any in-process transaction.

An aspect of the disclosure pertains to an apparatus for performing pipelined data processing. The apparatus comprises a first memory storing data protected by Error Correction Code (ECC) bits and a memory indexer configured to identify, within the first memory, a subset of the data matching to an index, the index received in a transaction from a series of transactions. The apparatus comprises Error Correction Code (ECC) logic configured to receive the identified subset of data and perform an ECC calculation on the data to produce a corrected subset of data and a comparator configured to receive selectively receive either the first subset of data or the corrected subset of data. The comparator is configured to receive the corrected subset of data, from the ECC logic, in response to a detected correctable error in the subset of data identified by the memory indexer, and to an operating mode indicator being set to an error condition operating mode. Otherwise, the comparator is configured to receive the identified subset of data, during the performance of the ECC calculation by the ECC logic. The apparatus also comprises an operating mode controller configured to clear the operating mode indicator of the error condition operating mode in response to detecting a gap in the series of transactions that has at least a predetermined size.

BRIEF DESCRIPTION OF THE DRAWING

FIGS. 3A-3D depict example aspects of pipelined processing of memory transactions made with a cache that has ECC-protected tags;

DETAILED DESCRIPTION

The following disclosure presents an example of a pipeline used for accessing an L2 cache in the context of a microprocessor. However, this disclosure pertains more generally to pipelined access to any memory protected by an ECC strategy. This disclosure pertains also to any situation in which multiple requests or operations may be processed in a pipelined fashion, and which may generate error(s) that require reuse of one or more functional units in order to be resolved.

Figure 1A:
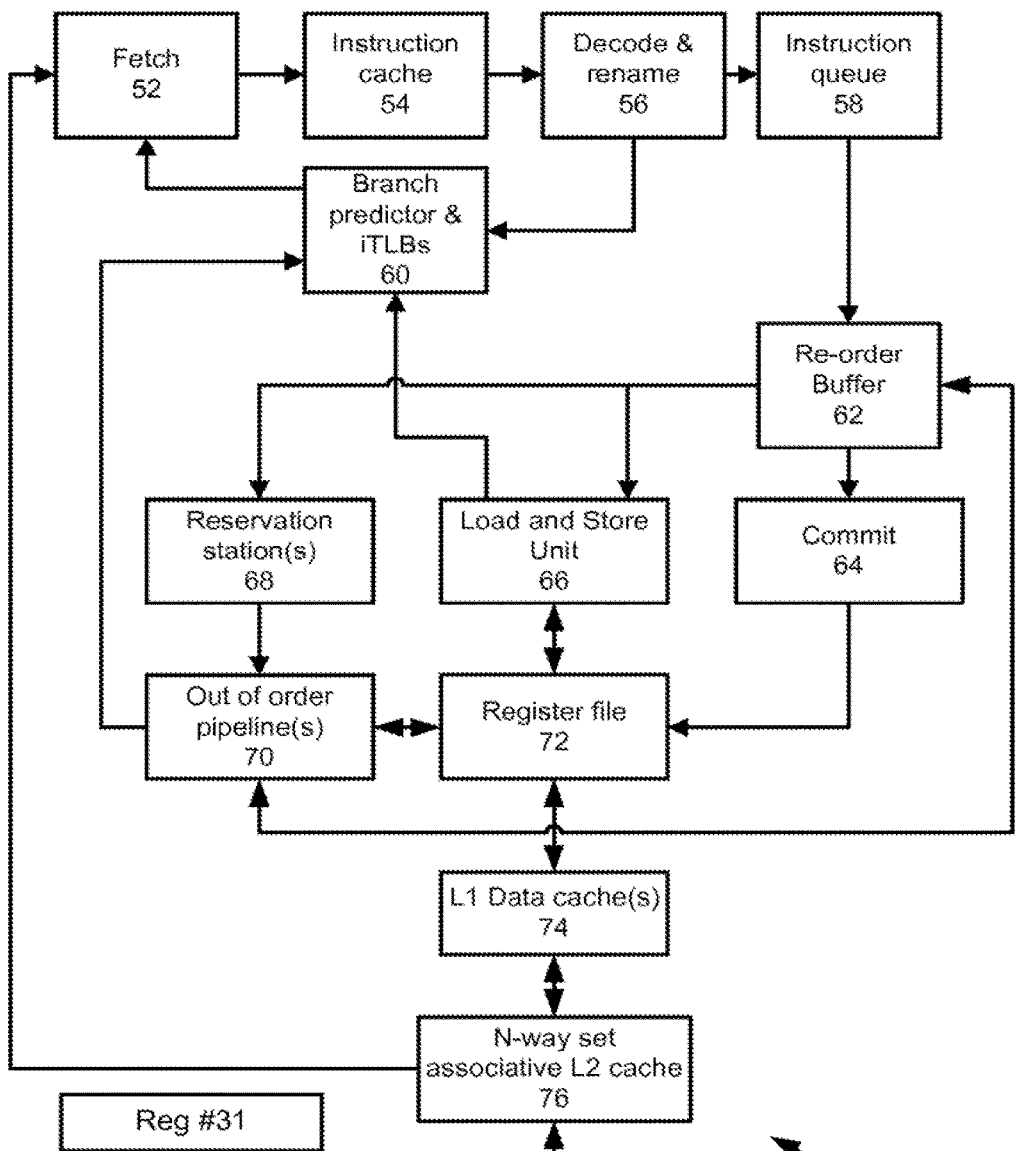
FIGS. 1A and 1B depicts block diagrams pertaining to an example processor which can implement aspects of the disclosure.

FIG. 1A depicts an example diagram of functional elements of a processor 50 that may provide ECC protection for tag bits of a cache, according to aspects of the disclosure. The example elements of processor 50 will be introduced first, and then addressed in more detail, as appropriate. This example is of a processor that is capable of out of order execution; however, disclosed aspects can be used in an in-order processor implementation. As such, FIG. 1A depicts functional elements of a microarchitectural implementation of the disclosure, but other implementations are possible. Also, different processor architectures can implement aspects of the disclosure. The names given to some of the functional elements depicted in FIG. 1A may be different among existing processor architectures, but those of ordinary skill would understand from this disclosure how to implement the disclosure on different processor architectures, including those architectures based on pre-existing architectures and even on a completely new architecture.

Processor 50 includes a fetch unit 52, which is coupled with an instruction cache 54. Fetch unit 52 is responsible for retrieving data to be interpreted as instructions. Instruction cache 54 is coupled with a decode and rename unit 56. Decode and rename unit 56 is coupled with an instruction queue 58 and also with a branch predictor that includes an instruction Translation Lookaside Buffer (iTLB) 60. Instruction queue 58 is coupled with a Re-order Buffer (ROB) 62 which is coupled with a commit unit 64. ROB 62 is coupled with reservation station(s) 68 and a Load/Store Unit (LSU) 66. Reservation station(s) 68 are coupled with Out of Order (OO) execution pipeline(s) 70. Execution pipeline(s) 70 and LSU 66 each couple with a register file 72. LSU 66 performs loads and stores of data to and from memory. For example, LSU 66 may execute loads and stores of different sizes (e.g., byte, word, and double word.)

Register file 72 couples with an L1 data cache(s) 74. L1 cache(s) 74 couple with an N-way set associative L2 cache 76. Applications of the disclosure can be applied to direct-mapped caches and to fully associative caches, and an N-way interleaved cache is an example. In one example, N is 8 or 16, depending on a size of L2 cache 76. Processor 50 may also have access to further memory hierarchy elements 78. Fetch unit 52 obtains instructions from a memory (e.g., L2 cache 76, which can be a unified cache for data and instructions). Fetch unit 52 can receive directives from branch predictor 60 as to which instructions should be fetched.

Functional elements of processor 50 depicted in FIG. 1A may be sized and arranged differently in different implementations. For example, instruction fetch 52 may fetch 1, 2, 4, 8 or more instructions at a time. Decode and rename 56 may support different numbers of rename registers and queue 58 may support different maximum numbers of entries among implementations. ROB 62 may support different sizes of instruction windows, while reservation station(s) 68 may be able to hold different numbers of instructions waiting for operands and similarly LSB 66 may be able to support different numbers of outstanding reads and writes. Instruction cache 54 may employ different cache replacement algorithms and may employ multiple algorithms simultaneously, for different parts of the cache 54. Defining the capabilities of different microarchitecture elements involve a variety of tradeoffs beyond the scope of the present disclosure.

Implementations of processor 50 may be single threaded or support multiple threads. Implementations also may have Single Instruction Multiple Data (SIMD) execution units. Execution units may support integer operations, floating point operations or both. Additional functional units can be provided for different purposes. For example, encryption offload engines may be provided. FIG. 1A is provided to give context for aspects of the disclosure that follow and not by way of exclusion of any such additional functional elements. This is a non-exhaustive enumeration of examples of design choices that can be made for a particular implementation of processor 50.

Figure 1B:
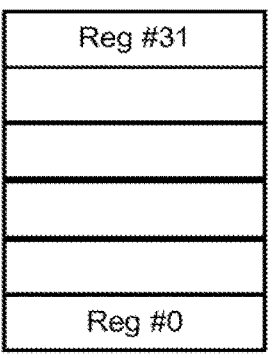

FIG. 1B depicts that register file 72 of processor 50 may include 32 registers. Each of these registers contains 64-bits. Each register may be identified by a binary code associated with that register. In a simple example, 00000b identifies Register 0, 11111b identifies Register 31, and registers in between are numbered accordingly. Processor 50 performs computation according to specific configuration information provided by a stream of instructions. These instructions are in a format specified by the architecture of the processor. An instruction may specify one or more source registers, and one or more destination registers for a given operation. The binary codes for the registers are used within the instructions to identify different registers. The registers that can be identified by instructions can be known as "architectural registers", which present a large portion, but not necessarily all, of the state of the machine available to executing code. Implementations of a particular processor architectural may support a larger number of physical registers. Having a larger number of physical registers allows speculative execution of instructions that refer to the same architectural registers. Register file 72 may have different numbers and kinds of ports in different implementations. For example, some implementations may supply two ports, while others may supply more. Some implementations may have designated read ports and write ports.

N-way set associative cache 76 provides an opportunity for each unique address in memory to be located in any one of N ways of cache 76. For a given cache size, there will be a number of locations, each having N ways. Each of these locations has a tag for each way, indicating which memory address currently has data in that way combination.

Figure 2:
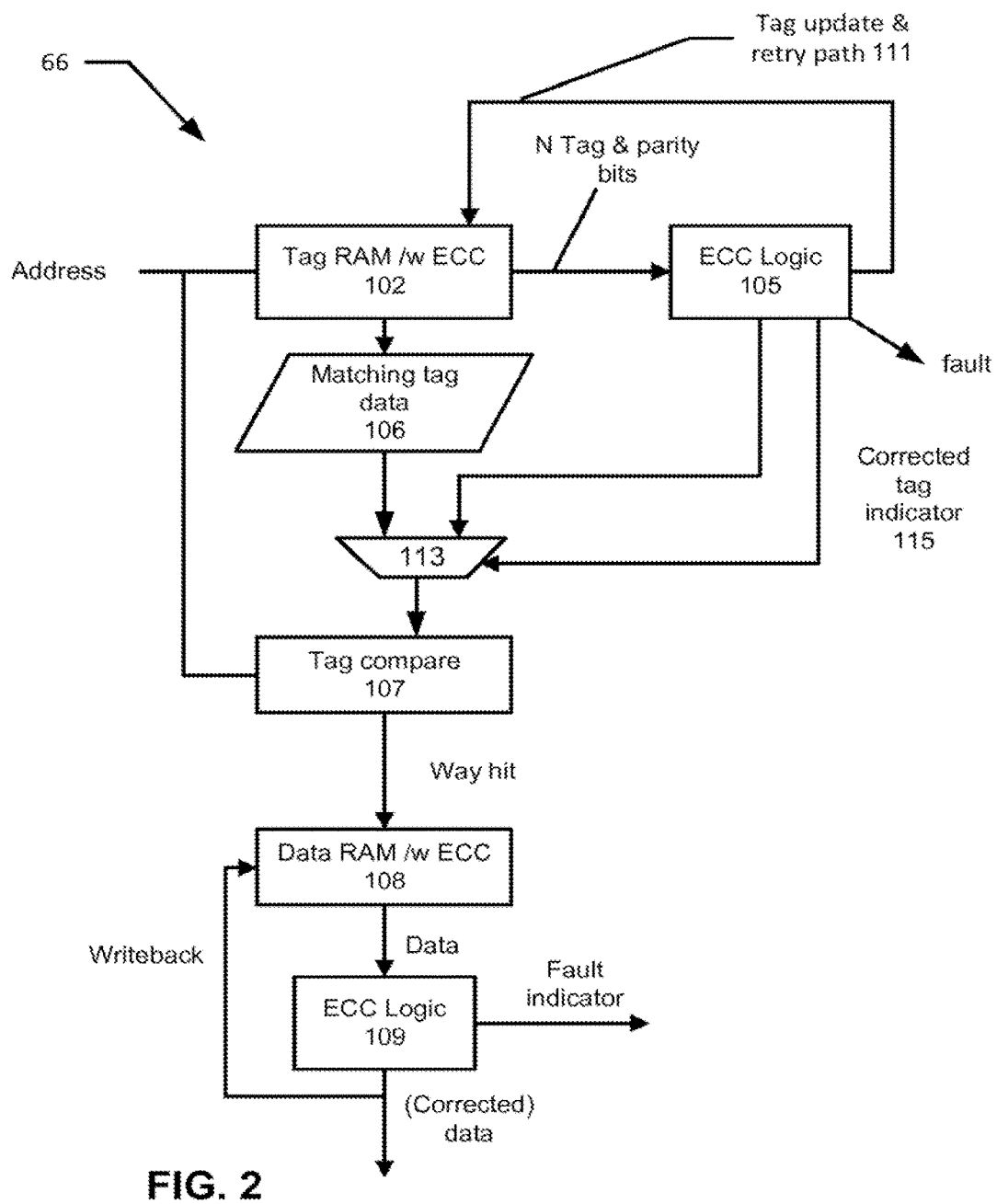
FIG. 2 depicts an example of an L2 cache that supports Error Correct Code techniques for cache tags.

As depicted in FIG. 2, an address that is sought to be read is supplied to a tag RAM 102. Not considering ECC, the address is used to index each way (of N ways) of the cache that might be holding data for that address, in order to produce N different tags (matching tag data 106) that need to be compared with the address (the address does not need to be a full address, as those of ordinary skill in the art would appreciate, and here address refers to a number of bits of the memory location required to identify the ways of the cache that could hold the addressed data). Matching tag data 106 is supplied to tag compare logic 107, which also receives a portion of the address to be compared with the tags. If the address has data stored in the cache, it will be found by tag compare 107 to match to exactly one of the tags. The way holding the matching tag is indicated as a way hit, which is supplied to read data from data RAM 108.

In the context of ECC, the operation of cache 76 becomes more complex. When Tag RAM 102 is read, ECC bits can be read with the tag. The ECC bits are used in an algorithm to determine whether or not there are detectable or detectable and correctable errors in any of the tags. Thus, for an N-way cache, the ECC algorithm needs to be performed for each of the N tags that were read. The algorithm used depends on the nature of the ECC algorithm. One example is a Hamming code. However, a variety of data encoding strategies exist that allow error detection or error detection and correction. The algorithm can be performed by ECC logic 105. ECC logic 105 outputs a corrected tag indicator 115 that can be interpreted to mean that the tags do not have any detected uncorrectable errors and but had one or more detected errors that were corrected. Therefore, corrected tag indicator 115 represents an indication that the tags need to be compared with the address again. ECC logic 105 also provides an output of the corrected tags. A selector 113 determines whether tag data 106 or corrected tag data from ECC logic 105 should be supplied to tag compare 107. The cache data itself also can be protected by ECC, and ECC logic 109 can perform the ECC check on data that is read. As explained with respect to FIGS. 3A-3D, selector 113 operates according to corrected tag indicator 115.

Completing ECC for the tag data can take time. Since in many cases, the tag data read will not have any error, it is desirable to avoid delaying a read of the cache until ECC completes. FIGS. 3A-3D depict an example pipeline for processing a plurality of requests made of a cache according to the disclosure; these requests can be cache line reads, but they more broadly represent any access to cache tags. More broadly, the aspects presented below can be employed in a variety of pipelined processing situations, in which an exception or error condition may require re-execution of one or more earlier stages of processing, as will become clearer in view of the disclosures that follow.

FIG. 3A depicts a pipeline in which a Read 112 begins processing at Clock 1 by reading 118 the tags (based on a supplied portion of an address, as explained above). At Clock 2, an ECC calculation 120 begins. At this point, a compare 121 of the tags that were read and a remainder of the address may be commenced. This compare 121 is speculative, in that there may be errors in any of the N tags that have not yet been corrected or identified. Upon identifying a match, a read 122 of the data RAM may be conducted; this read also is speculative because it occurs in the same clock cycle as an ECC correction 124 (if there was no detected error, then ECC correction consumes a clock cycle, but need not perform any processing). After results of ECC correction 124 are made available, it can be determined whether or not data from the speculative read needs to be discarded. If there were no corrected errors, then the speculative read is accurate, and no further processing is necessary. However, if there was a corrected error and no uncorrectable, detected, errors in the tags (e.g, that there were only single bit errors), then the ECC-corrected tag data is now accurate. As shown in FIG. 2, the corrected tag data should be written back into the tag in an update. As shown in FIG. 3B, this update is shown as occurring in Clock 4, with update tag 130. FIG. 2 depicts a tag update and retry path 111 which is used to update the Tag RAM 102. In parallel with the update, the tag data resulting from the ECC correction is outputted to selector 113, which is used to select between matching tag data 106 and corrected tag data from ECC logic 105.

Corrected tag indicator 115 also indicates that the cache access pipeline is to be put into an error processing condition. When in an error processing condition, tag compare 107 needs to be reused in order for read 112 to complete. In this example, read 112 needs to reuse tag compare 107 in Clock 4 (identified as compare 136 in FIG. 3B).

Tag compare 107 needs to be reused in this example, because there is only one tag compare circuit in this example. Although circuitry implementing tag compare 107 could be duplicated, such duplication may presents significant costs, even though such circuitry would only be used when processing tags with corrected errors.

Since tag compare 107 is being used at Clock 4, a subsequent read that is earlier in the pipeline cannot use tag compare 107 on the cycle in which it naturally is supposed to. In FIG. 3B, for example, a read 114 starting at Clock 3 would naturally have performed a speculative tag compare 147 at Clock 4 (if operating in a normal mode).

One solution to this pipeline conflict issue would be to flush or restart in-progress requests that are after read 112 from the pipeline, and restart them. For example, read 114 could be restarted at Clock 4. In this circumstance, there would be a one-cycle penalty in restarting read 114 at Clock 4, Applicants have appreciated that this solution may impair an overall throughput of a computing system, because there may have been other intermediate processing steps that occurred and which would also need to be re-executed in such a situation, or additional logic would be required to recover more intermediate state.

Instead of such a solution, implementations of the present disclosure instead continue to process certain new transactions as though they have had an error corrected using ECC. In the example of FIG. 3C, read 114 begins at Clock 3, where a read 135 of the tags is conducted. However, a speculative tag compare is not conducted for read 114, as was the case for read 112. Instead, an ECC calculation is performed 142, and an ECC correction 144 is performed (or a clock cycle used if no correction is required) at Clock 5.

Then, at Clock 6, a tag compare 147 is conducted. An update to tag 146 may be performed, if there were corrected errors in the tags. Then, a read 150 of data RAM may be performed. Thus, regardless whether any tag error was corrected, read 114 is processed as though tags used in that read were corrected. Read 114 necessarily will require more clock cycles to complete than if it had been restarted, because there would be a one-cycle penalty for restarting read 114 at Clock 4, but there is a two-cycle penalty for performing tag compare and data RAM read consecutively, rather than as a speculative tag compare and read that overlaps the ECC process. However, Applicants have appreciated that this non-intuitive approach provides benefits elsewhere in the system that in many designs outweigh the disadvantage.

Figure 3D:
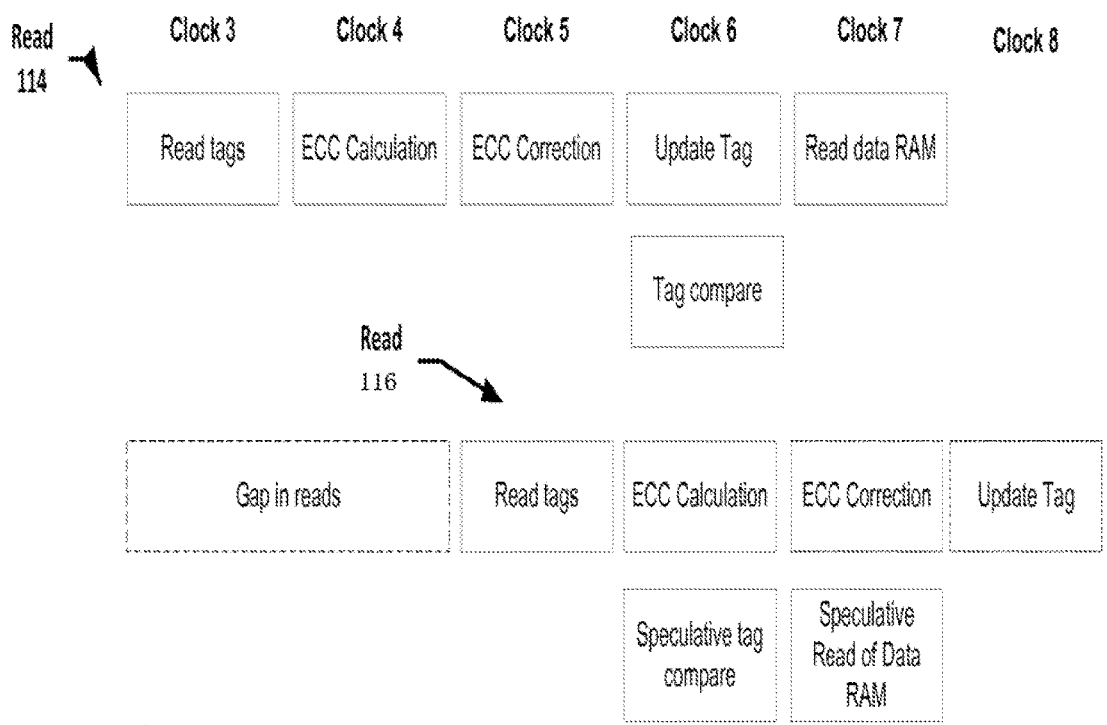

FIG. 3D depicts an example of how the pipeline can be reset to non-error operating conditions. In FIG. 3D, the processing of read 114 is repeated for context. Read 116 begins after a gap of two clocks (here, a gap of two clocks is a minimum required to reset the pipeline to a non-error condition). The gap may arise as a result of a natural gap in transactions, for example. Different pipelined situations in which these disclosures may be employed may have different transaction scheduling characteristics. For example, some implementations may not support scheduling transactions on every clock. Also, different implementations may have a functional unit conflict at different points in the pipeline. For example, a directly subsequent transaction might not conflict, but further transaction might. Implementations of the disclosure include all of these various usages, unless specifically stated otherwise. For example, terms such as 'subsequent' do not imply a restrictive meaning, such as 'directly following'. As such, FIG. 3D, in one implementation, represents an opportunistic approach to resetting the pipeline, rather than forcing partially-completed and conflicting transactions to restart. A minimum gap required to allow a reset of the pipeline to speculative execution may vary in different implementations, and this is an example.

In FIG. 3D, the tags are read at Clock 5 for read 116 and ECC calculation begins at Clock 6, along with speculative tag compare, followed by a speculative of data from the data RAM that has a matching tag. ECC correction also occurs in clock 7, if necessary, and an update to the tag occurs in Clock 8, if necessary. As in FIG. 3A, however, if the ECC calculation presents no error, then the speculative read is correct, and Read 116 can be completed after Clock 7. With respect to ECC logic 105, if there were uncorrected and detected errors, a fault indicator can be triggered, which may generate an interrupt, for example.

Figure 4:
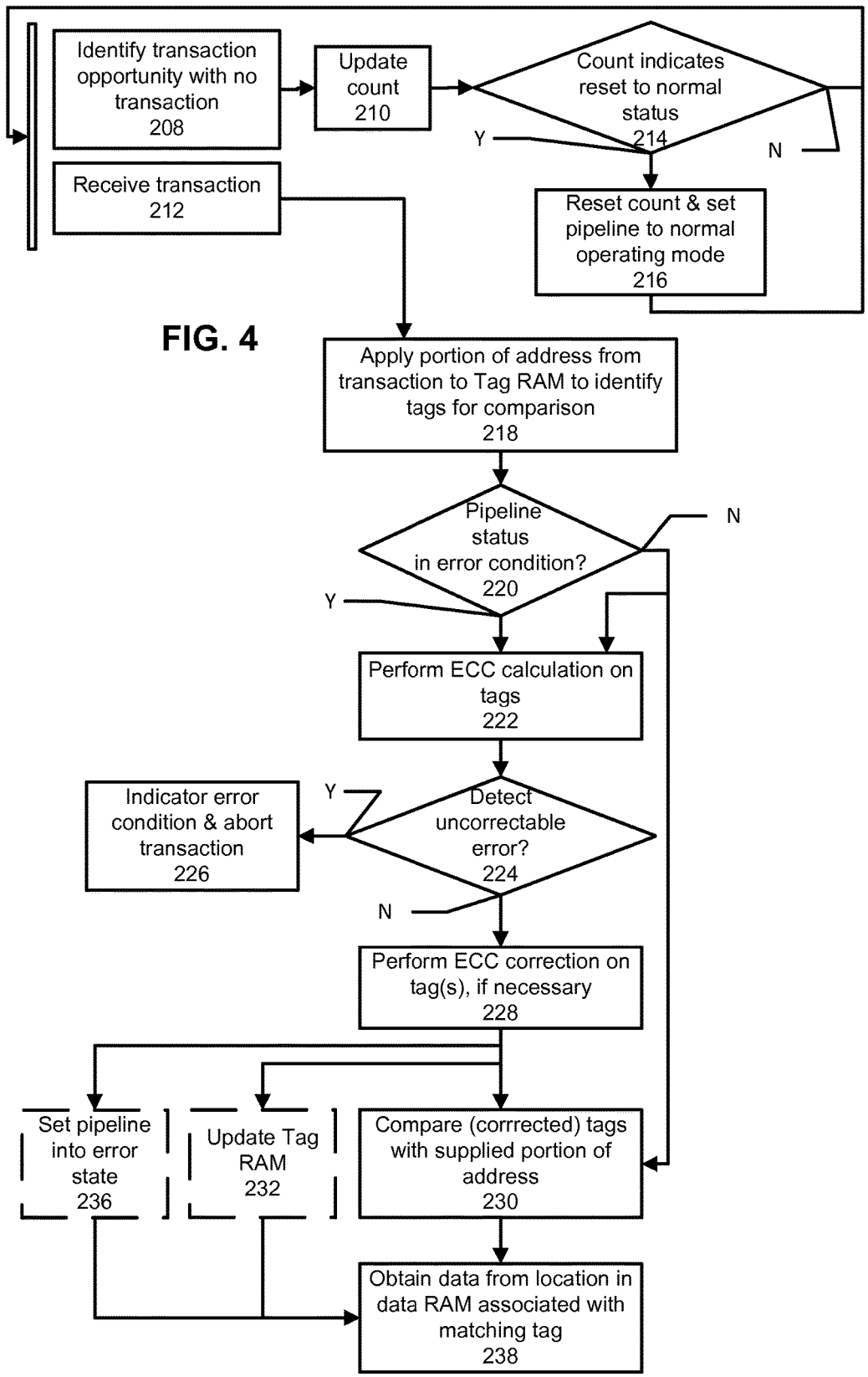
FIG. 4 depicts an example process according to the disclosure.

FIG. 4 depicts an example process of how transactions can be processed in an implementation of the disclosure. There are a wide variety of ways to express to actions performed in implementations of the disclosure, which are logically equivalent. For example, actions 208, 210, 214 and 216 may be implemented as an independent process, from the remainder of the actions depicted in FIG. 4.

At 208, an opportunity to schedule a transaction is identified, which is not coincident with a new transaction to be serviced. At 212, the alternative occurs, in which a transaction is received to be processed. If there was no transaction received, at 210, a count is updated. At 214, if the count indicates that the pipeline can enter normal operating mode, then the pipeline is taken out of a then-current error mode at 216, by resetting the count and setting an operating mode bit, for example. Otherwise, the process can return to 208/212, in which either a transaction is received or there is an opportunity to receive a transaction and none occurs. In an implementation, each clock cycle may represent an opportunity to receive a transaction.

If a transaction was received (i.e., action 212 occurred), regardless of a current operating mode of the pipeline, then at 218, a set identifier (which can be a portion of an address supplied with the transaction) is applied to the Tag RAM to identify a set of cache locations that may contain the data to be accessed. This set would have N-ways in an N-way set-associative cache, and the data could be in any one of the ways and a tag is produced for each way. Further operations are typically conducted to assess validity of data in each cache way, but these actions are not detailed here.

At 220, a determination whether the pipeline is or isn't currently operating in an error condition is made, and if the pipeline is operating in an error mode, then at 222, an ECC calculation is performed, and at 224, it is determined based on the ECC calculation whether any detected uncorrectable error was found. If there was such an error, then that error is indicated and the transaction can be aborted at 226. Otherwise, an ECC correction can be performed, if needed, at 228. At 230, tags that either were retrieved or retrieved and corrected are compared with a remainder of an address from the transaction, to determine which way contains data matching to that address (if any). If no error correction was performed on the tag data, then data being output from the ECC calculation is the same as was retrieved, and it is equivalent, for the purposes of the present invention, to use the data retrieved from the tag RAM or the data that is outputted from the ECC calculation process, and those of ordinary skill would be able to design apparatuses and processes according to the disclosure that operate in either manner.

At 232, if there was a corrected error, then the tag or tags that were corrected are updated in the tag RAM. At 236, if the pipeline is not in an error mode, it is set to error mode, (if in error condition, the pipeline is maintained in error mode). At 238, data is obtained from a location associated with a matching tag (assuming there was a cache hit).

Considering again decision 220, if the pipeline was not in error mode, then both the actions described above and actions 230 and 238 are performed at least partially concurrently, (e.g., as a speculative tag compare and read). A timeline of how such concurrency may occur is depicted with respect to FIGS. 3A-3D.

Figure 5:
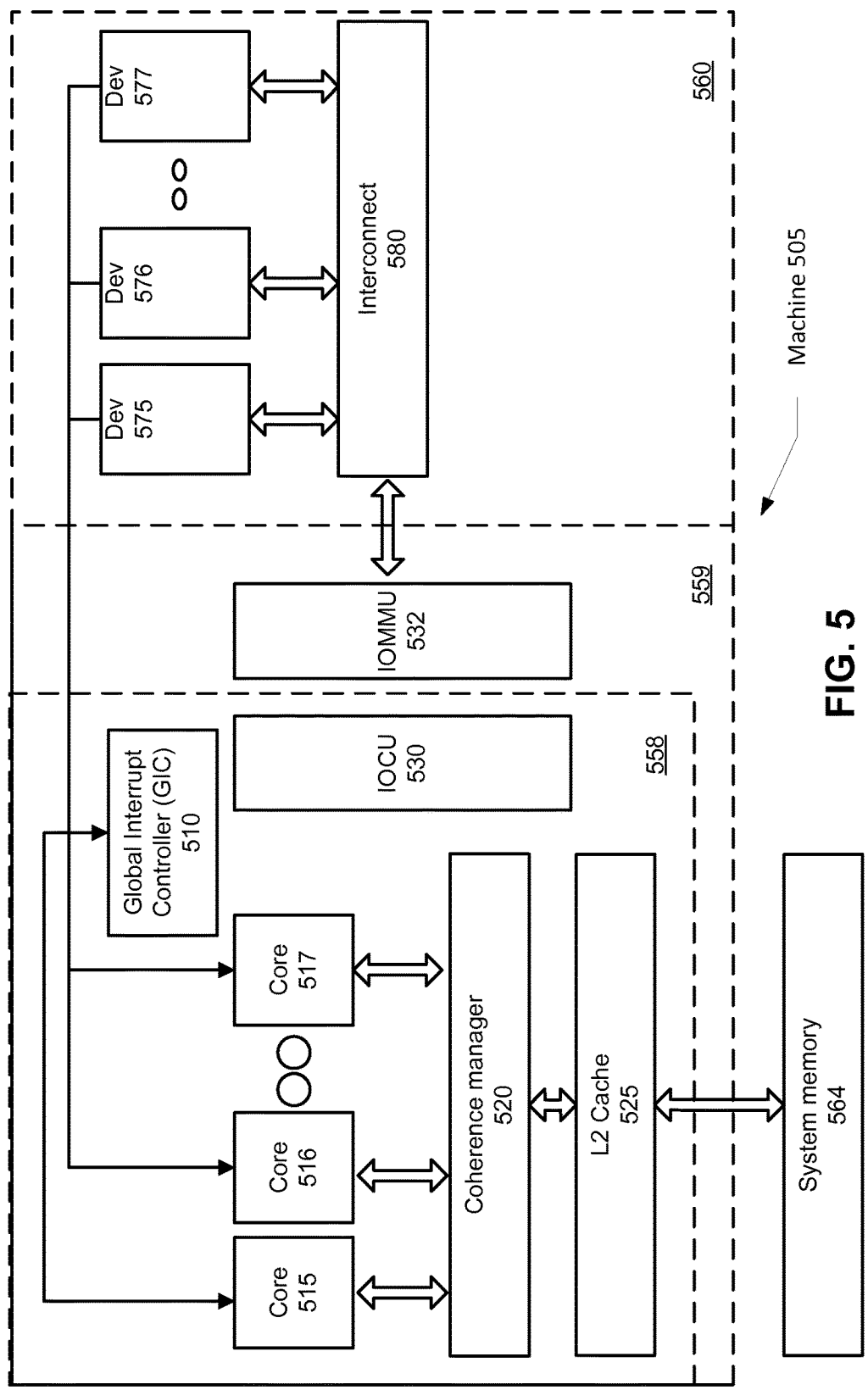
FIG. 5 depicts a block diagram of an example hardware-oriented block diagram of a machine that can implement aspects of the disclosure.

FIG. 5 depicts an example of a machine 505 that implements execution elements and other aspects disclosed herein. FIG. 5 depicts that different implementations of machine 505 can have different levels of integration. In one example, a single semiconductor element can implement a processor module 558, which includes cores 515-517, a coherence manager 520 that interfaces cores 515-517 with an L2 cache 525, an I/O controller unit 530 and an interrupt controller 510. A system memory 564 interfaces with L2 cache 525. Coherence manager 520 can include a memory management unit and operates to manage data coherency among data that is being operated on by cores 515-517. Cores may also have access to L1 caches that are not separately depicted. In another implementation, an IO Memory Management Unit (IOMMU) 532 is provided. IOMMU 532 may be provided on the same semiconductor element as the processor module 558, denoted as module 559. Module 559 also may interface with IO devices 575-577 through an interconnect 580. A collection of processor module 558, which is included in module 559, interconnect 580, and IO devices 575-577 can be formed on one or more semiconductor elements. In the example machine 505 of FIG. 19, cores 515-517 may each support one or more threads of computation, and may be architected according to the disclosures herein.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described.

Above, various examples of computing hardware and/or software programming were explained, as well as examples how such hardware/software can intercommunicate. These examples of hardware or hardware configured with software and such communications interfaces provide means for accomplishing the functions attributed to each of them. For example, a means for performing implementations of software processes described herein includes machine executable code used to configure a machine to perform such process. Some aspects of the disclosure pertain to processes carried out by limited configurability or fixed function circuits and in such situations, means for performing such processes include one or more of special purpose and limited-programmability hardware. Such hardware can be controlled or invoked by software executing on a general purpose computer.

Aspects of functions, and methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets and the like.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Modern general purpose processors regularly require in excess of two billion transistors to be implemented, while graphics processing units may have in excess of five billion transistors. Such transistor counts are likely to increase. Such processors have used these transistors to implement increasing complex operation reordering, prediction, more parallelism, larger memories (including more and bigger caches) and so on. As such, it becomes necessary to be able to describe or discuss technical subject matter concerning such processors, whether general purpose or application specific, at a level of detail appropriate to the technology being addressed. In general, a hierarchy of concepts is applied to allow those of ordinary skill to focus on details of the matter being addressed.

For example, high level features, such as what instructions a processor supports conveys architectural-level detail. When describing high-level technology, such as a programming model, such a level of abstraction is appropriate. Microarchitectural detail describes high level detail concerning an implementation of an architecture (even as the same microarchitecture may be able to execute different ISAs). Yet, microarchitectural detail typically describes different functional units and their interrelationship, such as how and when data moves among these different functional units. As such, referencing these units by their functionality is also an appropriate level of abstraction, rather than addressing implementations of these functional units, since each of these functional units may themselves comprise hundreds of thousands or millions of gates. When addressing some particular feature of these functional units, it may be appropriate to identify substituent functions of these units, and abstract those, while addressing in more detail the relevant part of that functional unit.

Eventually, a precise logical arrangement of the gates and interconnect (a netlist) implementing these functional units (in the context of the entire processor) can be specified. However, how such logical arrangement is physically realized in a particular chip (how that logic and interconnect is laid out in a particular design) still may differ in different process technology and for a variety of other reasons. Many of the details concerning producing netlists for functional units as well as actual layout are determined using design automation, proceeding from a high level logical description of the logic to be implemented (e.g., a "hardware description language").

The terms "circuitry" and "logic" do not imply a single electrically connected set of circuits. Circuitry may be fixed function, configurable, or programmable; logic may comprise one or more circuits provided for an identified purpose and may be part of a functional unit. In general, circuitry implementing a functional unit is more likely to be configurable, or may be more configurable, than circuitry implementing a specific portion of a functional unit. For example, an Arithmetic Logic Unit (ALU) of a processor may reuse the same portion of circuitry differently when performing different arithmetic or logic operations. As such, that portion of circuitry is effectively circuitry or part of circuitry for each different operation, when configured to perform or otherwise interconnected to perform each different operation. Such configuration may come from or be based on instructions, or microcode, for example.

In all these cases, describing portions of a processor in terms of its functionality conveys structure to a person of ordinary skill in the art. In the context of this disclosure, the term "unit" refers, in some implementations, to a class or group of circuitry that implements the functions or functions attributed to that unit. Such circuitry may implement additional functions, and so identification of circuitry performing one function does not mean that the same circuitry, or a portion thereof, cannot also perform other functions. In some circumstances, the functional unit may be identified, and then functional description of circuitry that performs a certain feature differently, or implements a new feature may be described. For example, a "decode unit" refers to circuitry implementing decoding of processor instructions. The description explicates that in some aspects, such decode unit, and hence circuitry implementing such decode unit, supports decoding of specified instruction types. Decoding of instructions differs across different architectures and microarchitectures, and the term makes no exclusion thereof, except for the explicit requirements of the claims. For example, different microarchitectures may implement instruction decoding and instruction scheduling somewhat differently, in accordance with design goals of that implementation. Similarly, there are situations in which structures have taken their names from the functions that they perform. For example, a "decoder" of program instructions, that behaves in a prescribed manner, describes structure supports that behavior. In some cases, the structure may have permanent physical differences or adaptations from decoders that do not support such behavior. However, such structure also may be produced by a temporary adaptation or configuration, such as one caused under program control, microcode, or other source of configuration.

Different approaches to design of circuitry exist, for example, circuitry may be synchronous or asynchronous with respect to a clock. Circuitry may be designed to be static or be dynamic. Different circuit design philosophies may be used to implement different functional units or parts thereof. Absent some context-specific basis, "circuitry" encompasses all such design approaches.

Although circuitry or functional units described herein may be most frequently implemented by electrical circuitry, and more particularly, by circuitry that primarily relies on a transistor implemented in a semiconductor as a primary switch element, this term is to be understood in relation to the technology being disclosed. For example, different physical processes may be used in circuitry implementing aspects of the disclosure, such as optical, nanotubes, micro-electrical mechanical elements, quantum switches or memory storage, magnetoresistive logic elements, and so on. Although a choice of technology used to construct circuitry or functional units according to the technology may change over time, this choice is an implementation decision to be made in accordance with the then-current state of technology. This is exemplified by the transitions from using vacuum tubes as switching elements to using circuits with discrete transistors, to using integrated circuits, and advances in memory technologies, in that while there were many inventions in each of these areas, these inventions did not necessarily fundamentally change how computers fundamentally worked. For example, the use of stored programs having a sequence of instructions selected from an instruction set architecture was an important change from a computer that required physical rewiring to change the program, but subsequently, many advances were made to various functional units within such a stored-program computer.

Also, in some cases terminology has been used herein because it is considered to more reasonably convey salient points to a person of ordinary skill, but such terminology should not be considered to impliedly limit a range of implementations encompassed by disclosed examples and other aspects.

Also, a number of examples have been illustrated and described in the preceding disclosure. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

We claim:

1. A pipelined Error Correction Code (ECC) memory access method, in which a plurality of transactions are overlapped in time, comprising:

while in a normal mode, processing a memory transaction by speculatively comparing a set of tags retrieved from a tag RAM with a portion of an address supplied with the memory transaction, and initializing a speculative read from a cache location associated with a tag from the set that matched to the portion of the address, while an ECC operation is being performed for the set of tags;

while in an error condition mode, processing a memory transaction by first completing an ECC operation on a set of tags retrieved from the tag RAM for that memory transaction and then initiating a comparison using tag data resulting from the ECC operation with a portion of an address supplied with the memory transaction and reading a cache location associated with a tag from the set that matched to the portion of the address;

entering the error condition mode, in response to an ECC operation indicating a correctable error in a set of tags for a memory transaction being processed; and resetting to the normal mode in response to detecting a gap of at least a predetermined size between memory transactions of said plurality of transactions;

wherein reading from the cache is processed as though a tag used in the read was corrected regardless of whether any tag error was corrected when the ECC operation was performed.

2. The pipelined ECC memory access method of claim 1, wherein the memory transactions occur on scheduling opportunities, and the resetting comprises detecting at least a minimum number of scheduling opportunities on which a memory transaction did not occur.

3. The pipelined ECC memory access method of claim 2, wherein each scheduling opportunity corresponds to a clock event on a clock.

4. The pipelined ECC memory access method of claim 1, wherein processing memory transactions in the normal mode comprises reusing a tag comparison circuit to perform a comparison of the tag data resulting from the ECC operation, after speculatively comparing the set of tags retrieved from the tag RAM and determining that the ECC operation resulted in a corrected tag error.

5. The pipelined ECC memory access method of claim 1, wherein processing memory transactions in the normal mode comprises cancelling the speculative read, in response to the ECC operation indicating a correctable error, and reusing a tag comparison circuit to perform a comparison of corrected tag data resulting from the ECC operation.

6. The pipelined ECC memory access method of claim 1, wherein processing memory transactions in the normal mode comprises committing the speculative read in response to the ECC operation resulting in no detected error.

7. The pipelined ECC memory access method of claim 1, wherein the gap is detected as a gap of a size equal to or greater than a number of clock cycles required to perform the speculative comparison of the set of tags, and the speculative read from the cache location identified by the speculative comparison of the set of tags.

8. The pipelined ECC memory access method of claim 1, wherein the method comprises processing every memory transaction, while in the error condition mode, as a non-speculative transaction.

9. An apparatus for performing Error Correction Code (ECC) memory access, in which a plurality of transactions are overlapped in time, comprising:
a tag RAM, for an N-way set associative cache, the tag RAM comprising storage for Error Correction Code (ECC) bits calculated from contents of the tags;
ECC logic for performing an ECC calculation using ECC bits pertaining to a set of tags, obtained from the tag RAM, in response to indexing the tag RAM with a portion of a memory address, the ECC logic configured for producing a corrected set of tags, in response to a detected and correctable error in the set of tags;
tag compare circuitry to operate in either a speculative compare mode or an error condition mode,
when in the speculative compare mode, to receive the set of tags from the tag RAM, to compare the set of tags with a portion of the memory address, and output a matching tag, without using a result of the ECC calculation, and
when in the error condition mode, to receive the corrected set of tags from the ECC logic, to compare the corrected set of tags with the portion of the memory address and output a matching tag; and
control circuitry configured to maintain the tag compare unit in an error condition mode, in response to the ECC logic detecting a correctable error in the set of tags, through one or more additional transactions of said plurality of transactions, regardless whether any error was detected in respective sets of tags obtained from the tag RAM for those one or more additional transactions;
wherein the one or more additional transactions are processed as though an error was detected in the respective sets of tags obtained from the tag RAM for the one or more additional transactions regardless of whether any error was detected.

10. The apparatus for performing Error Correction Code (ECC) memory access of claim 9, wherein the control circuitry is configured to enter into the error condition mode, in response to the ECC calculation indicating a corrected error, and reusing the tag compare circuitry on a subsequent clock to compare corrected tag data, and automatically causing the one or more subsequent transactions to use the tag compare circuitry at least one clock event later than such one or more subsequent transactions would have used the tag compare circuitry when in the speculative compare mode.

11. The apparatus for performing Error Correction Code (ECC) memory access of claim 9, further comprising a tag RAM update path configured for updating the tag RAM in response to the ECC logic producing a corrected tag.

12. The apparatus for performing Error Correction Code (ECC) memory access of claim 9, further comprising a selector configured to select between contents of the tag RAM and an output of the ECC logic in dependence on the ECC logic indicating the detected and correctable error.

13. The apparatus for performing Error Correction Code (ECC) memory access of claim 9, wherein the tag RAM and the N-way set associative cache are implemented in a single memory circuit.

* * * * *